United States Patent
Boloorian (12) 
(10) Patent No.: US 6,950,458 B2
(45) Date of Patent: Sep. 27, 2005

(54) METHOD AND APPARATUS FOR ACQUIRING SLOT TIMING AND FREQUENCY OFFSET CORRECTION AND STORAGE MEDIUM STORING CONTROL PROGRAM THEREFOR

(75) Inventor: Majid Boloorian, Kirkland, WA (US)

(73) Assignee: NEC Corporation, Tokyo (JP)

( * ) Notice: Subject to any disclaimer, the term of this patent is extended or adjusted under 35 U.S.C. 154(b) by 764 days.

(21) Appl. No.: 09/956,697

(22) Filed: Sep. 19, 2001

(65) Prior Publication Data

US 2002/0061054 A1 May 23, 2002

(30) Foreign Application Priority Data

Sep. 20, 2000 (GB) .............................. 0023116

(51) Int. Cl.⁷ .............................................. H04B 1/69
(52) U.S. Cl. ...................... 375/149; 375/140; 375/147; 375/149
(58) Field of Search ................ 375/149, 365, 375/206

(56) References Cited

U.S. PATENT DOCUMENTS 5,276,706 A    1/1994  Critchlow 6,728,326 B1 * 4/2004 Fulghum ..................... 375/365

FOREIGN PATENT DOCUMENTS

GB     2 309 315     7/1997

OTHER PUBLICATIONS

European Search Report dated Dec. 11, 2002.

* cited by examiner

*Primary Examiner*—Stephen Chin
*Assistant Examiner*—Erin M. File
(74) *Attorney, Agent, or Firm*—Dickstein, Shapiro, Morin & Oshinsky, LLP.

(57) ABSTRACT

A method and apparatus for acquiring slot timing and frequency offset correction of a local oscillator, provided for use in a direct sequence spread spectrum receiver. The received signals in such a system comprise a plurality of sequential slots of data. Some of these comprise synchronization data. At least two different correlations are performed at a receiver between the received data and a locally stored synchronization code. These are compared to determine which give the strongest correlation peak and the timing of this peak is then stored. The offset to be applied to a local oscillator in the receiver is then estimated from this time and subsequently applied to the local oscillator.

12 Claims, 10 Drawing Sheets

FIG.12 slot boundary positions

METHOD AND APPARATUS FOR ACQUIRING SLOT TIMING AND FREQUENCY OFFSET CORRECTION AND STORAGE MEDIUM STORING CONTROL PROGRAM THEREFOR

BACKGROUND OF THE INVENTION

1. Field of the Invention

The present invention relates to a method and apparatus for acquiring slot timing and frequency offset correction in a direct sequence spread spectrum communications (DSS) system and a storage medium storing control program therefor, and is particularly applicable to the acquisition and offset correction in a wideband code division multiple access (WCDMA) network such as the proposed universal mobile telecommunications system (UMTS).

2. Description of the Related Art

In cellular communication systems, the timing and frequency accuracy of transmissions from network base stations rely on very stable and highly accurate reference oscillators. As here are a fixed and relatively small number of network base stations in a system such as UMTS, or any other mobile phone system, the reference oscillators and the network base stations can be relatively expensive and accurate. An accuracy of e.g., 0.05 parts per million (ppm) is typical and more accurate oscillators are available. In such systems, however, there are typically far more mobile stations which communicate with the network base stations. In a system such as UMTS, these are mobile telephones which have to be sold at a competitive market price and therefore costs have to be minimized. Therefore, low cost reference oscillators such as voltage control crystal oscillators (VCXO) would usually be selected for the reference oscillators of mobile stations. The reference accuracy of these low cost reference oscillators is relatively low, e.g. 5 ppm.

Because the accuracy of the mobile oscillators is much less than that available to the base stations with their more accurate reference oscillators, significant problems can occur with synchronization between the base station transmission and the locally generated carrier frequency used for down conversion.

SUMMARY OF THE INVENTION

In view of the above, it is an object of the present invention to provide a method and apparatus for acquiring slot timing and frequency offset correction and a storage medium storing control program therefore, specifically a method and apparatus for acquiring slot timing and frequency offset correction in a direct sequence spread spectrum communications receiver in which at least two different correlations are performed at a receiver between a received data and a locally stored synchronization code and the offset to be applied to a local oscillator in the receiver is estimated from the timing of the strongest correlation peak, and a storage medium storing control program therefore.

According to a first aspect of the present invention, there is provided a method for acquiring slot timing and frequency offset correction of a local oscillator in a direct sequence spread spectrum receiver wherein received signals include a plurality of sequential slots of data, at least one of which includes synchronization data, the method including the steps of performing at least two different correlations between the received data and a locally stored synchronization code, comparing the results of the correlations, determining which correlation gives the strongest correlation peak, storing a time signal corresponding to the strongest correlation peak, estimating the offset to be applied to the local oscillator from the time signal, and applying the estimated offset to the local oscillator.

In the foregoing, a preferable mode is one wherein the steps of performing at least two correlations and comparing the results, include the steps of performing at least two sequential and different correlations, and performing at least one further correlation if the result of the comparison of correlation peaks shows that a second correlation gives a stronger peak than a first correlation.

Also, a preferable mode is one wherein one of the correlations is generated from a correlation of the whole of the locally stored synchronization code with the received data.

Also, a preferable mode is one wherein one of the correlation peaks is derived from a sum of a plurality of correlations of parts of the locally stored synchronization code with the received data.

Also, a preferable mode is one wherein one of the correlation peaks is derived from a sum and average of repeated correlations with the whole of the locally stored synchronization code.

Also, a preferable mode is one wherein one of the correlation peaks is derived from a sum of full and partial correlations with the locally stored synchronization code.

According to a second aspect of the present invention, there is provided an apparatus for acquiring slot timing and frequency offset correction of a local oscillator in a direct sequence spread spectrum receiver wherein received signals include a plurality of sequential slots of data, at least some of which includes synchronization data, the apparatus including means for performing at least two different correlations between the received data and a locally stored synchronization code, means for comparing the results of the correlations, means for determining which correlation gives the strongest correlation peak, means for storing a time signal corresponding to the strongest correlation peak, means for estimating the offset to be applied to the local oscillator from the time signal, and means for applying the estimated offset to the local oscillator.

In the foregoing, a preferable mode is one wherein the means for performing at least two correlations and the means for comparing the results include means for performing at least two sequential and different correlations, and means for performing at least one further correlation if the result of the comparison of correlation peaks shows that a second correlation gives a stronger peak than a first correlation.

Also, a preferable mode is one wherein one of the correlations is generated from a correlation of the whole of the locally stored synchronization code with the received data.

Also, a preferable mode is one wherein the means for performing correlations includes mean for summing a plurality of correlations of parts of the locally stored synchronization code with the received data.

Also, a preferable mode is one wherein the means for performing correlations includes means for summing and averaging repeated correlations with the whole of the locally stored synchronization code.

Also, a preferable mode is one wherein the means for performing correlations includes means for summing two or more partial correlations with the locally stored synchronization code.

According to a third aspect of the present invention, there is provided a storage medium storing a control program to cause a computer to carry out a method for acquiring slot timing and frequency offset correction of a local oscillator in a direct sequence spread spectrum receiver, the method including a step of performing at least two different correlations between the received data and a locally stored synchronization code, a step of comparing the results of the correlations, a step of determining which correlation gives the strongest correlation peak, a step of storing a time signal corresponding to the strongest correlation peak, a step of estimating the offset to be applied to the local oscillator from the time signal, and a step of applying the estimated offset to the local oscillator.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

The problems discussed above and the solution provided by embodiments of the invention is described with reference to UMTS. It is, however, not limited to this transmission standard and can be applied to any WCDMA systems.

In UMTS, base stations which transmit and receive signals to mobile stations are asynchronous. Transmissions from the base stations need to be synchronized locally by mobiles which receive them. This is performed in an initial cell search when a mobile unit has power applied to it.

UMTS transmissions comprise a sequence of frames. Each of these has, e.g., 15 slots and contained within each of these is information dependent on the data rate to be used. Each slot contains member symbols where each symbol typically comprises 2 bits. These 2 bits can be used to transmit 4 possible states using quadrature phase shift keying. Therefore, a slot of 10 symbols comprises 20 bits.

Figure 2:
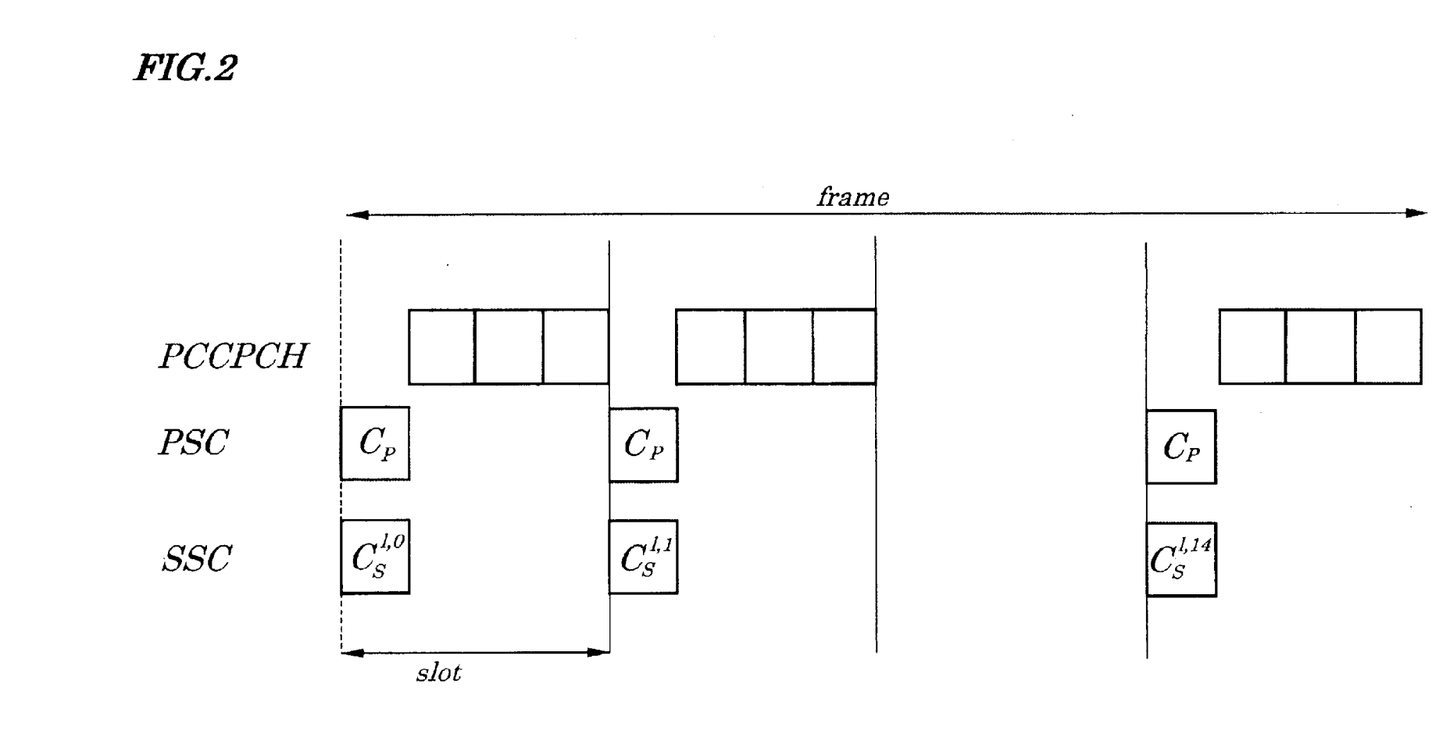
FIG. 2 illustrates the composition of base station transmissions.

Base station transmissions include a synchronization channel (SCH) which is aligned with a slot boundary and a primary common control physical channel (PCCPCH). The synchronization channel comprises a primary synchronization code (PCS) and a secondary synchronization code (SSC) as illustrated in FIG. 2. These are used in the initial cell search.

Figure 1:
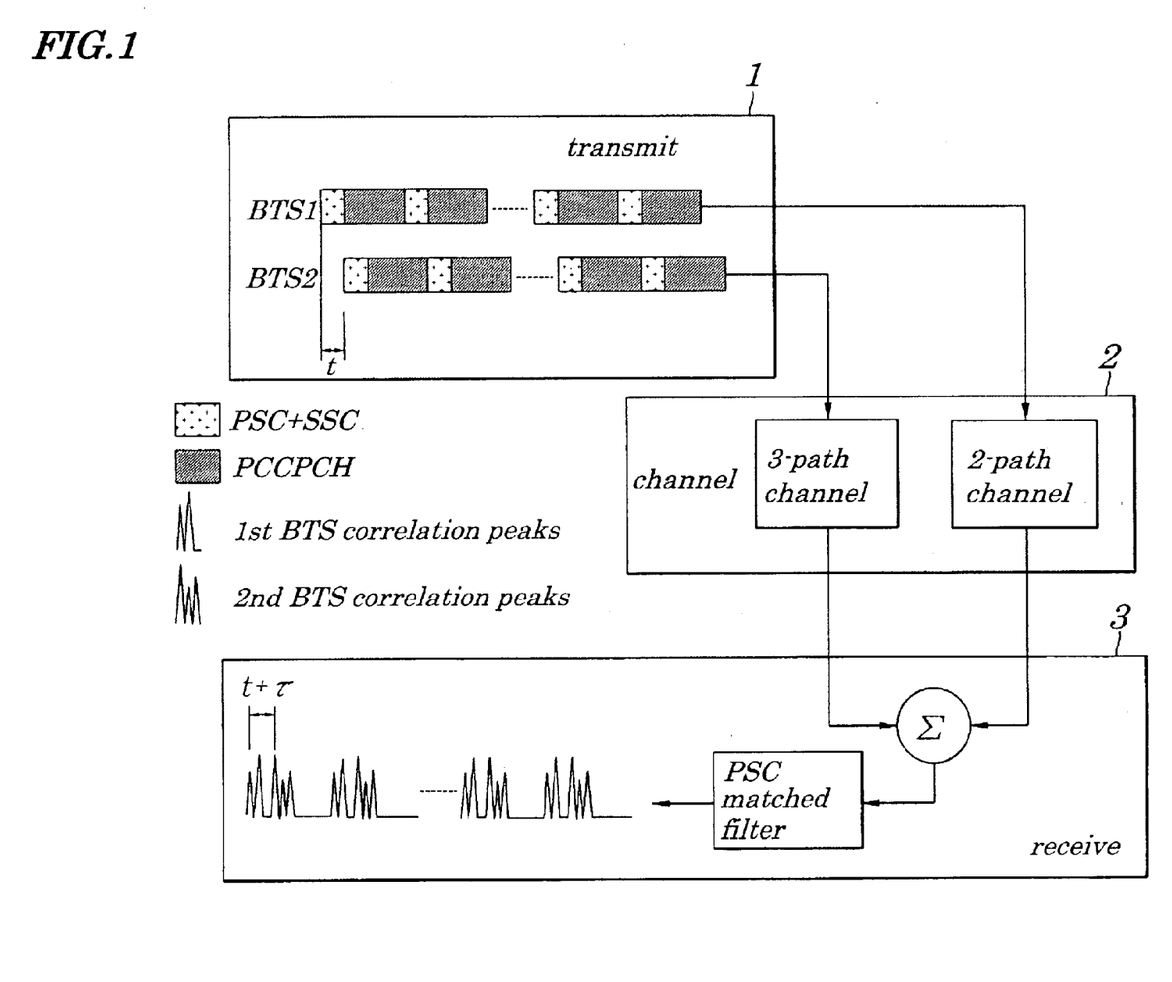
FIG. 1 is a schematic illustration of base station transmissions to a receiver.

Initial cell search by a mobile station is performed in three steps. The first of these is the acquisition of slot synchronization to the transmissions of the base station providing the strongest signal at the receiver of a mobile station. FIG. 1 illustrates schematically base station broadcast transmissions which are represented at 1, a transmission channel at 2, and a mobile station receiver at 3. In this example, transmissions from two base stations (BTS1 and BTS2) are shown.

The base station transmissions are not synchronized with each other and transmit frames comprising slots and symbols as described above. The time intervals for slots and frames are fixed.

In FIG. 1, the start of a slot for the transmissions from BTS2 is shown to be delayed from the start of a slot for transmissions from BTS1 by an arbitrary amount t seconds.

The transmissions from the base stations BTS1 and BTS2 to the receiver 3 will be effected by channel 2. Transmissions from BTS2 are illustrated as being received through a 3-path (multipath) channel while the transmissions of BTS1 are illustrated as being received through a 2-path channel. The effect of the channel 2 is to pass the signals from BTS1 and BTS2 to the receiver 3 where they are summed. Correlation of the received signal by the mobile receiver with the expected primary synchronization code stored in the receiver then provides a number of correlation peaks. The highest peak detected corresponds to the base station of the network to which the receiver will synchronize.

Correlation is performed on one slot and the results are held in a buffer. The results for a number of slots are added in. Noise and interference should be reduced and correlation will be the peak if any are detected.

The second step of the initial cell search establishes frame synchronization and identifies the code group of the base station found in step 1. The third step of the initial cell search determines the scrambling code assigned to the found base station. Further details of these second and third steps are not pertinent to the present invention and are therefore not discussed further here but will be known to those skilled in the art.

In down conversion at a mobile receiver the exact frequency to which the received signal is down converter may not be exactly the same as that at the transmitter because of inaccuracies in the local oscillator which arises because, as discussed above, it is lower in cost than that used at the base station. If there is a frequency offset, then the height of correlation peak will be reduced. If the offset is significant then the correlation peak may get buried In the noise and interference therefore making it impossible to synchronize to the slot boundaries.

The inaccuracy in the local oscillator is one possible cause of this frequency offset and preferred embodiments of the present invention seek to correct for this.

Preferred embodiments of the invention provide a method and apparatus for correcting the frequency offset during initial cell search in a direct sequence spread spectrum communications receiver. This is achieved by correlating the received data with a synchronization code stored in the receiver and, following estimation and correction of the frequency offset in accordance with a first correlation result, generating a second correlation result. The correlation periods are varied frequency offset correction is removed and the process is repeated if the second correlation signal is degraded from the first correlation signal. Otherwise, the original frequency offset correction is maintained.

The implementation of the invention described here in is applicable to the initial cell search performed at a mobile station operating in frequency division duplex (FDD) mode in a UMTS network. The performance of the UMTS cell search can be degraded by offsets in the carrier and sampling clock frequencies. In practice, both he carrier and sampling clock frequencies are derived from the frequency of a reference oscillator (usually a VCXO). The carrier ($f_c$) and the sampling clock frequencies ($f_{smp}$) may be expressed as in equations (1) and (2) respectively. The terms $k_1$ and $k_2$ in these equations represent constants and $f_x$ is the reference frequency supplied by the reference oscillator of the mobile station.

$$f_c = k_1 \times f_x \quad (1)$$

$$f_{smp} = k_2 \times k_x \quad (2)$$

Equations (1) and (2) indicate the ways in which inaccuracies in the reference frequency generated by the crystal oscillator translate into the inaccuracies in the carrier and sampling clock frequencies. When expressed in parts per million, the same inaccuracy will apply to each of the three frequencies, $f_x$, $f_c$, and $f_{smp}$. For example, for a desired carrier frequency of 2 GHz, and a sampling clock frequency of 15.36 MHz, an inaccuracy of 1 ppm (in $f_x$) represents offsets of 2 kHz in the carrier frequency and 15.36 Hz in the sampling frequency.

With regard to WCDA cell search, the carrier frequency offset results in a continuous phase variation of the received complex signal. The sampling clock frequency offset may cause incorrect detection of vital system timing instances. Any effects of an offset in the sampling clock frequency are observed only after processing of the signals in a large number of slots. The phase rotation caused by the offsets in the carrier frequency results in a decrease in the received ratio of the signal power to the noise plus interference power and as a consequence, an increase in the probability of instances of false detection of timing. Therefore, offsets in both the carrier frequency and the sampling clock frequency will result in a degradation of the performance in all three steps of the UMTS cell search process.

The loss of performance in the cell search caused by the frequency inaccuracies is evident during the first step of the cell search process. Sampling clock offsets may cause errors in detection of the slot boundaries i.e., the slot boundaries will be positioned in the wrong places. If the error in locating the slot boundaries is larger than one chip period, the results obtained by the remaining cell search steps will also be in error. For practical frequency inaccuracies, however, a slippage of 1 chip caused by the sampling clock inaccuracies is observed over long time intervals.

Consequently, the inaccuracies of the sampling clock of secondary importance when compared to the offsets in the carrier frequency. As the effects of an offsets in the carrier frequency are observable immediately, these effects can be measured and used to correct the reference frequency. A reduction in the inaccuracy of the reference frequency will reduce the offsets in both the carrier and sampling clock frequencies also. The method described herein is based on the differential phase offsets imparted to the received primary synchronization code at down-conversion by errors in the local oscillator frequency used for down-conversion. The resulting measurements of phase offset are used to correct he reference oscillator frequency.

A complex baseband signal transmitted by a base station may be represented as $$S_t = A(t)e^{j\theta(t)}$$

where A(t) and θ (t) represent the magnitude and phase respectively of the signal. The transmitted signal when received via a fading path can be represented as:

$$S_r = \beta(t)S_t e^{j(\Delta \omega t + \phi(t) + \sigma(t))} \quad (3)$$

where Δω is the carrier frequency offset in radians per second, φ (t) is the random phase (in radians) due to the Doppler shift and σ (t) is the random phase due to noise and interference. Variations of the signal envelope are represented as β (t).

In the first step of the UMTS cell search, the in phase (I) and quadrature (Q) components of the received signal are correlated with the primary synchronization code. When the local primary synchronization code is aligned with the first symbol of a received PCCPCH+SCH time-slot (i.e. at the slot boundary), the transmitted signal may be expressed as:

$$S_t = M e^{j\frac{\pi}{4}} \quad (4)$$

where M is a constant. The correlation of the corresponding received signal with the local primary synchronization code stored in the receiver is shown in equation (5), where T is the correlation period.

$$C = \int_0^T \left[\beta(t)M^2 e^{j\frac{\pi}{4}} e^{j(\Delta \omega t + \phi(t) + \sigma(t))}\right]dt \quad (5)$$

Equation (5) represents the correlation between the local primary synchronization code and the received signal at the slot boundaries. As the primary synchronization code is a known signal, the carrier frequency offset may be estimated by measuring the change in the phase of the received primary synchronization code. The effect of the signal components due to Doppler and noise plus interference are discussed below and for clarity are removed from equation 5 which may then be reduced to $$C = \int_0^T M^2 e^{j\frac{\pi}{4}} e^{j(\Delta \omega t)}dt \quad (6)$$

The correlation peak is then found by finding the power of the above integral. When the received and locally generated PSC's are aligned we can put $M^2 = 1$ and then the following relationship expresses the correlation power:

$$|C|^2 \propto \left[ T \times \frac{\sin\left(\frac{\Delta\omega \cdot T}{2}\right)}{\frac{\Delta\omega \cdot T}{2}} \right]^2 \quad (7)$$

Figure 3:
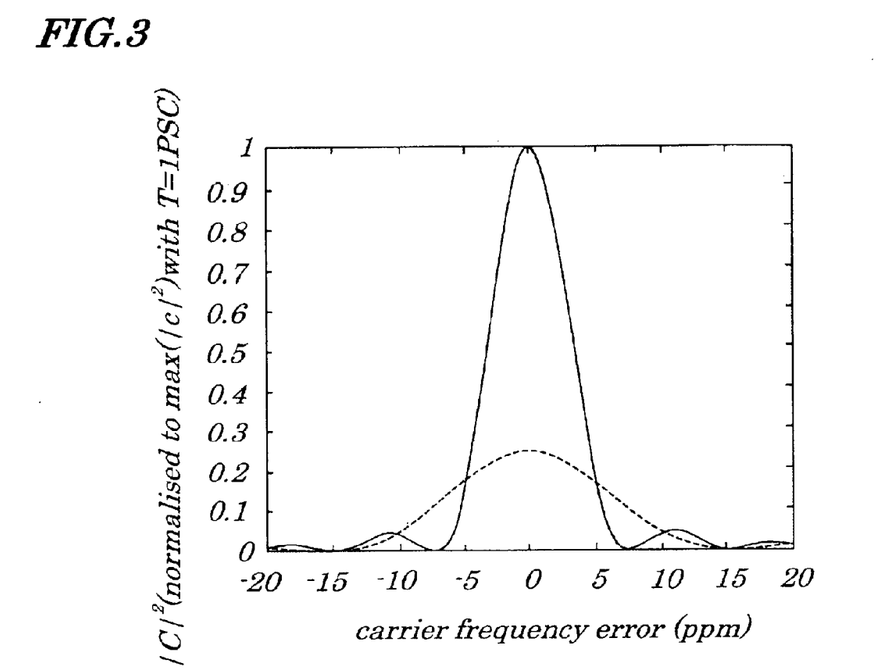
FIG. 3 is a plot of normalised correlation power versus frequency offset for full and partial correlations.

The graphical plot of FIG. 3 is derived from equation 7 and shows the value of correlation power versus the carrier frequency offset (in ppm) for correlation periods of 1 PSC (256 chips in FDD mode of UMTS) and ½ PSC. It can be seen from the plot that a correlation period of a whole synchronization code (1 PSC) results in a large correlation peak for small frequency errors around zero. The correlation period (T) of one half of a synchronization code (½ PSC) with its sin (x)/x behavior provides a lower correlation peak value for small carrier frequency errors. The reduction in the ½ PSC correlation peak value with increasing frequency error is however much less than is the case for the 1 PSC correlation.

The correlation peak in the case of T=1 PSC, for example reduces to zero for a frequency error of 7.5 ppm for the nominal carrier frequency of 2 GHz, the chip rate of 3.81 Mcps and the correlation period of 256 chips. The correlation peak corresponding to T=½ PSC has a significantly larger value for these conditions. As illustrated by FIG. 3, where large frequency offsets occur the consequent reduction in the correlation power prevents the discrimination of a correlation peak from noise and interference A cell search cannot be effective under these conditions.

It can therefore be seen that by performing a partial correlation, signal power is generated at points where a full correlation gives no power. This is useful if the frequency offset of the local oscillator is high. However, if partial correlation is performed for too small a portion of the PSC, its power level will fall below the overall noise level. Furthermore, the loss in the autocorrelation properties of the PSC becomes significant for every short correlation periods.

The effect of Doppler on the differential phase is minimized by ensuring that the differential phase values are obtained using partial correlation periods which are much less than the coherence time[1] of the transmission channel. For a mobile traveling at 500 km/h, envisaged as the maximum speed in 3 GPP standards, and a nominal carrier frequency of 2 GHz, the Doppler frequency is ~925 Hz. The corresponding value of coherence time is ~1 ms. Evaluation of differential phase value, as discussed above, uses one symbol of length ~67 μs which is well within the worst case coherence time. This indicated that statistically, variations of the correlation phase due to Doppler may be assumed small. As a result of this property, the differential phase values are not severely affected by the Doppler. However, as the frequency offset estimation approach relies on the statistical properties of the channel, a better estimate of the carrier frequency offset may be obtained by finding a set of values for the frequency offset estimate over a number of slots. Averaging may then be applied to reduce possible random variations of the differential phase resulted from Doppler.

[1] Coherence time is a period within which there is a high degree of correlation (similarity) between faded signal samples. Coherence time may be approximated by the inverse of the Doppler frequency shift.

When the receiver is moving the resulting Doppler shift sometimes can lead to amplification of the correlation peak and thereby increase the probability of detection of amplified peaks when a large frequency offset exists. With large frequency offset values such as 7.5 ppm, however, even such an amplification will not improve the performance. Furthermore, when the receiver is stationary and in the absence of Doppler, the cell search process cannot benefit from this amplification. In such situations, the characteristics of the ½ PSC correlation may be used to advantage.

Where large frequency offsets exist, instead of using full correlation over the PSC, the correlation nay be broken into a number of shorter partial correlations such as expressed by equations 8.

$$C_1 = \int_0^{\frac{T}{N}} M^2 e^{j\frac{\pi}{4}} e^{j(\Delta\omega t)} dt \quad (8)$$

$$C_2 = \int_{\frac{T}{N}}^{\frac{2T}{N}} M^2 e^{j\frac{\pi}{4}} e^{j(\Delta\omega t)} dt$$

$$C_N = \int_{(N-1)\frac{T}{N}}^{T} M^2 e^{j\frac{\pi}{4}} e^{j(\Delta\omega t)} dt$$

The sum of the powers of these partial correlations (i.e. $|C1|^2+|C2|^2+ \ldots +|CN|^2$) is then used to form a decision variable according to which the position of the slot boundary is determined.

Figure 4:
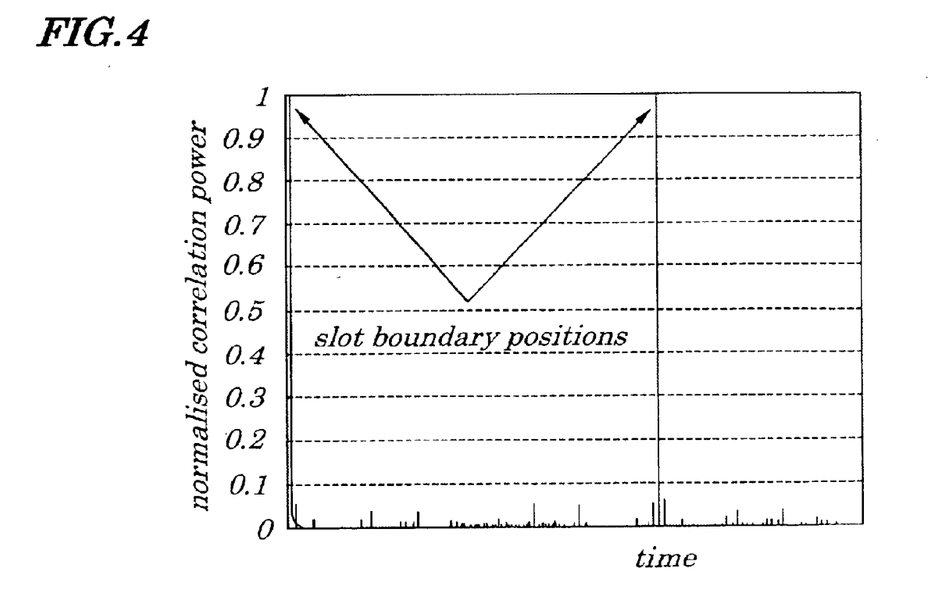
FIG. 4 illustrates the results of a full correlation with no frequency offset.
Figure 5:
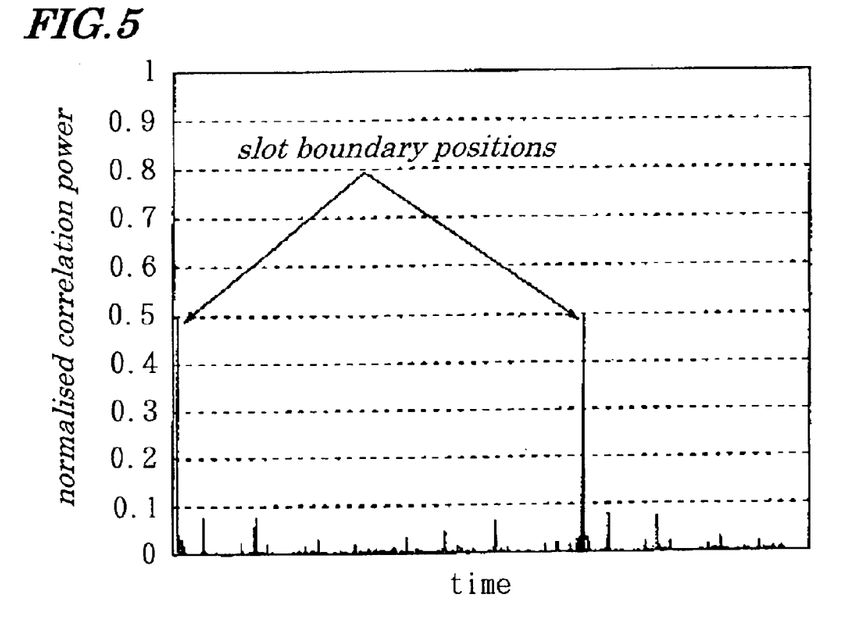
FIG. 5 shows the results from a sum of 2 partial correlations with no frequency offset.
Figure 6:
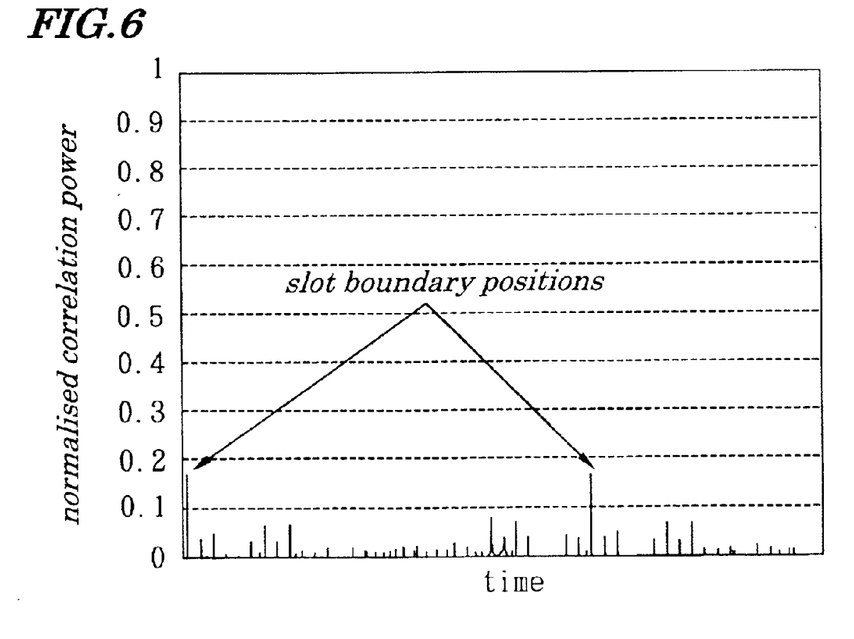
FIG. 6 shows the results from a full correlation at a frequency offset of 5 ppm.
Figure 7:
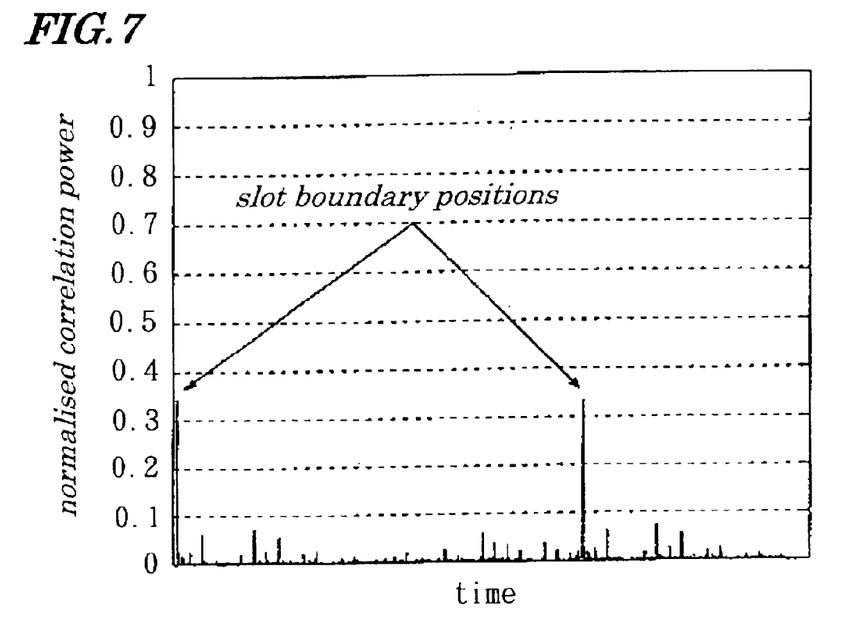
FIG. 7 shows the results from a sum of 2 partial correlations at a frequency offset of 5 ppm.
Figure 8:
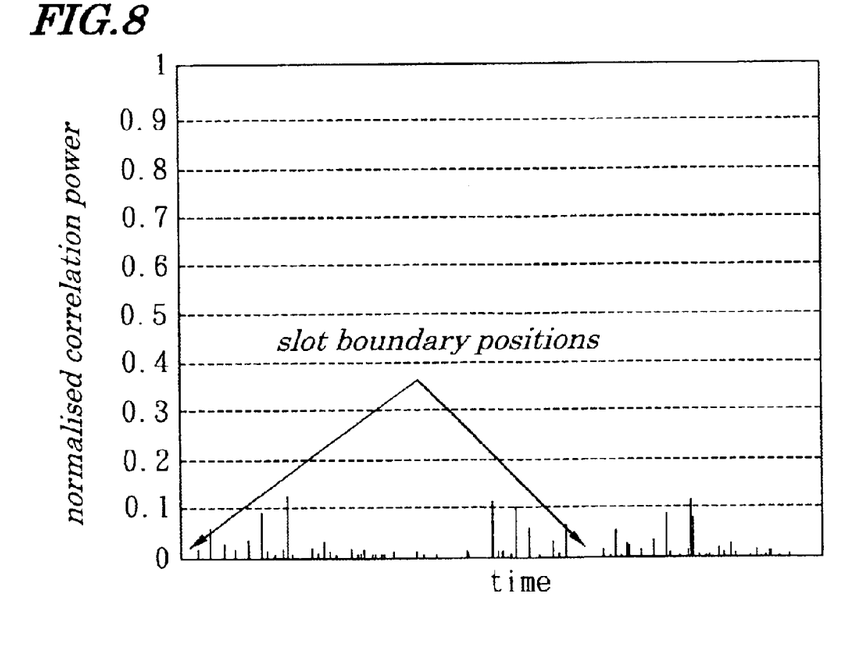
FIG. 8 shows the results from a full correlation at a frequency offset of 7.5 ppm.
Figure 9:
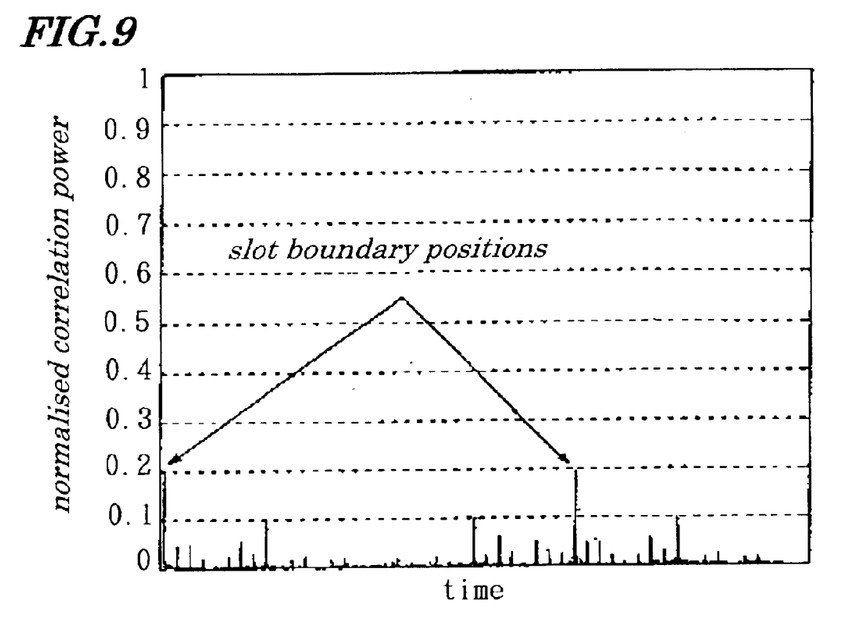
FIG. 9 shows the results from a sum of 2 partial correlations at a frequency offset of 7.5 ppm.
Figure 10:
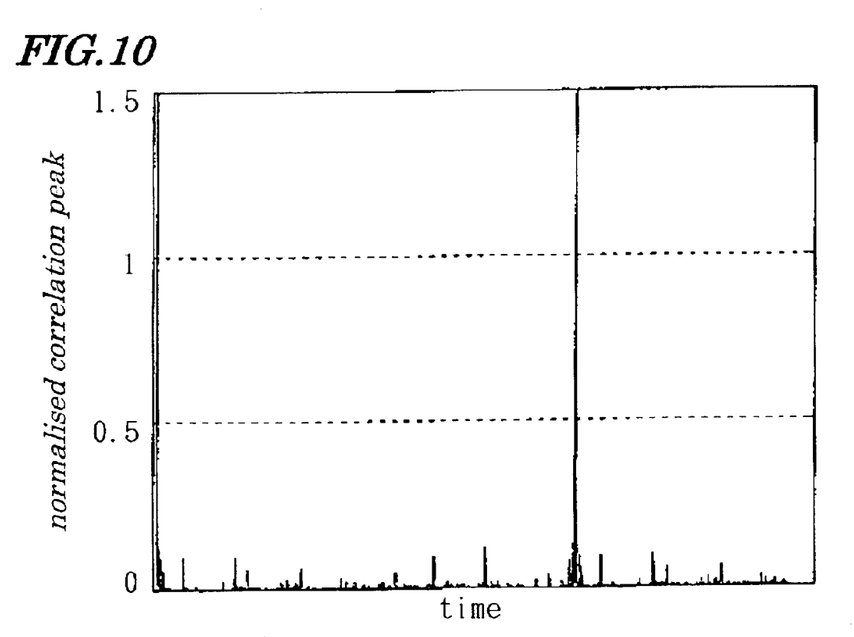
FIG. 10 shows the results from a sum of full and partial correlations with no frequency error.
Figure 11:
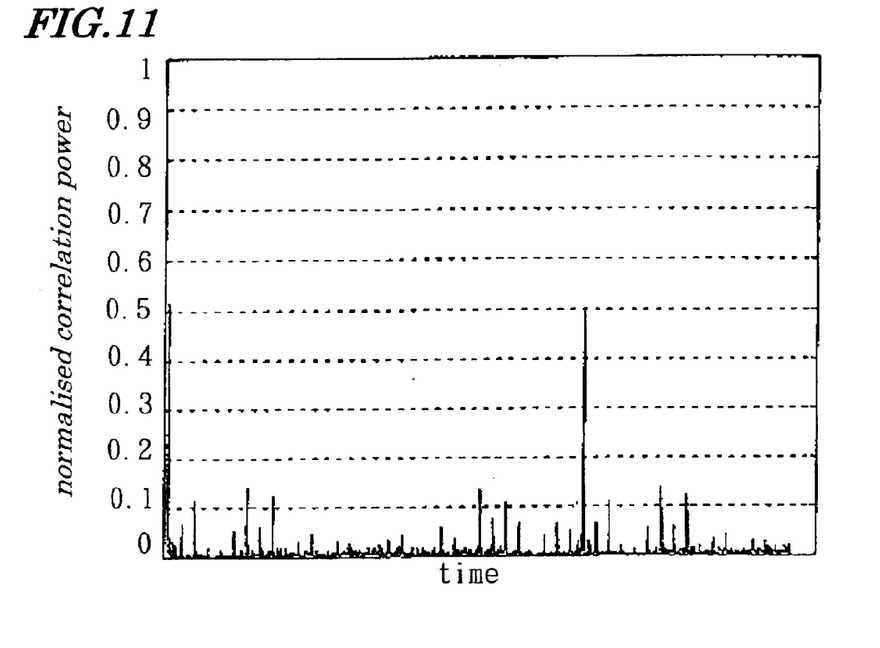
FIG. 11 shows the results from a sum of full and partial correlations at a frequency offset of 5 ppm.
Figure 12:
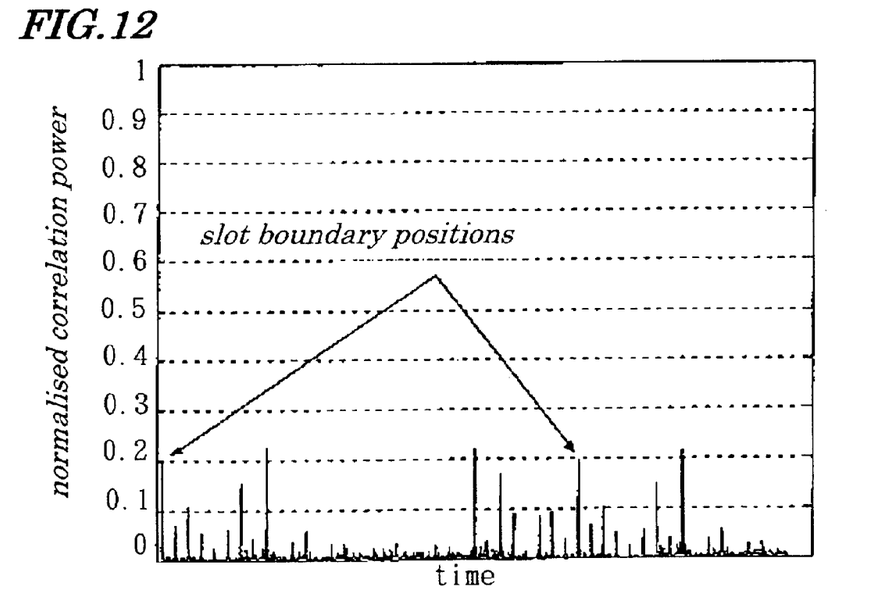
FIG. 12 shows the results from a sum of full and partial correlations at a frequency offset of 7.5 ppm.

By reference to FIGS. 4 to 12, the correlation peaks obtained using full or partial correlations may be compared. The plots in FIGS. 4 to 12 are for a stationary receiver. More specifically, FIG. 4 illustrates the results of a full correlation with no frequency offset. FIG. 5 shows the results from a sum of 2 partial correlations with no frequency offset. FIG. 6 shows the results from a full correlation at a frequency offset of 5 ppm. FIG. 7 shows the results from a sum of 2 partial correlations at a frequency offset of 5 ppm. FIG. 8 shows the results from a full correlation at a frequency offset of 7.5 ppm. FIG. 9 shows the results from a sum of 2 partial correlations at a frequency offset of 7.5 ppm. FIG. 10 shows the results from a sum of full and partial correlations with no frequency error. FIG. 11 shows the results from a sum of full and partial correlations at a frequency offset of 5 ppm. FIG. 12 shows the results from a sum of full and partial correlations at a frequency offset of 7.5 ppm.

With large carrier frequency errors and low signal to noise plus interference ratios, the probability of detection of the slot boundaries reduces when the receiver is stationary. It can be seen that the use of partial correlation provides larger peaks than would be obtained from full correlation for a range of carrier frequency errors. The sizes of the peaks derived from a series of partial correlations are not as large as those obtained with full correlation at zero frequency offset.

As the positions of the PSC peaks are deterministic and any peaks arising from noise and interference are not, larger PSC peaks may be obtained at the slot boundaries by adding the results of the full and partial correlations.

Figure 13:
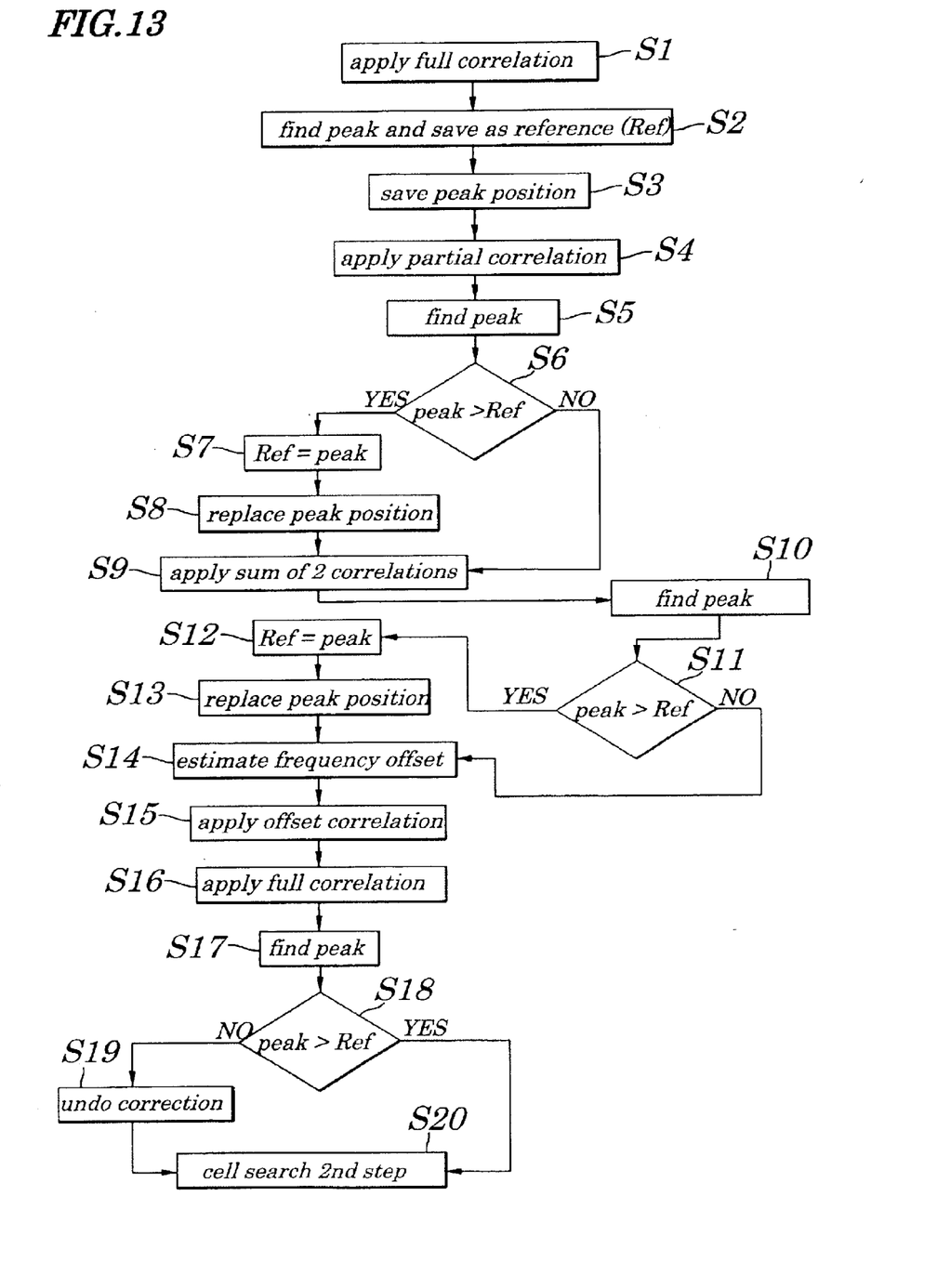
FIG. 13 is a flowchart illustrating the frequency offset correction process.

The operation of a method and apparatus embodying the invention is illustrated in the flowchart of FIG. 13. A block of the down converted received data stream is correlated with the locally stored PSC as a $1^{st}$ correlation in step S1. This first correlation is a full correlation i.e., PSC+PCCPCH data received in a slot is correlated with the whole of the locally stored PSC. The correlation signals referred to here maybe derived as an average of successive correlations over a number of slots. The power of the largest correlation peak is found and saved as a reference (Ref) in step S2. The corresponding position of this peak is saved as the first estimation of the slot boundary In step S3.

The received block of data is then correlated with the local PSC using a partial correlation (step S4). The largest peak of the result is found in step S5 and its power compared with Ref in step S6. If this power is larger than Ref, Ref is replaced by it in step S7, and the slot boundary is replaces by the position of the new peak (step S8). Step S9 is subsequently activated. If the new peak is not larger than Ref, step S9 is directly entered.

In step S9, the results of the full and partial correlations are added. The highest peak of the result is found in step S10, and step S11 compares the power of the new peak with Ref. If the new peak is larger than Ref, Ref is overwritten by the power of the new peak in step S12, and the slot boundary is replaced by the new peak's position in seep S13. The slot boundary information is then applied in step S14. If the new peak is smaller than Ref, step S14 is directly activated.

The carrier frequency offset is estimated in step S14 in accordance with the frequency offset estimate technique as discussed in our co-pending application GB0003859.6 or using other known techniques which will be apparent to those skilled in the art. The frequency offset estimation is used to rotate the input data block in step S15. The validity of the offset estimation is tested by correlating the result of rotation with the local PSC (step S16). If the resulting peak proves to be larger than Ref, the second step of the cell search process is entered in step S20. Otherwise, the rotation due to the offset estimate is removed in step S19 prior to entering a step S20.

Figure 14:
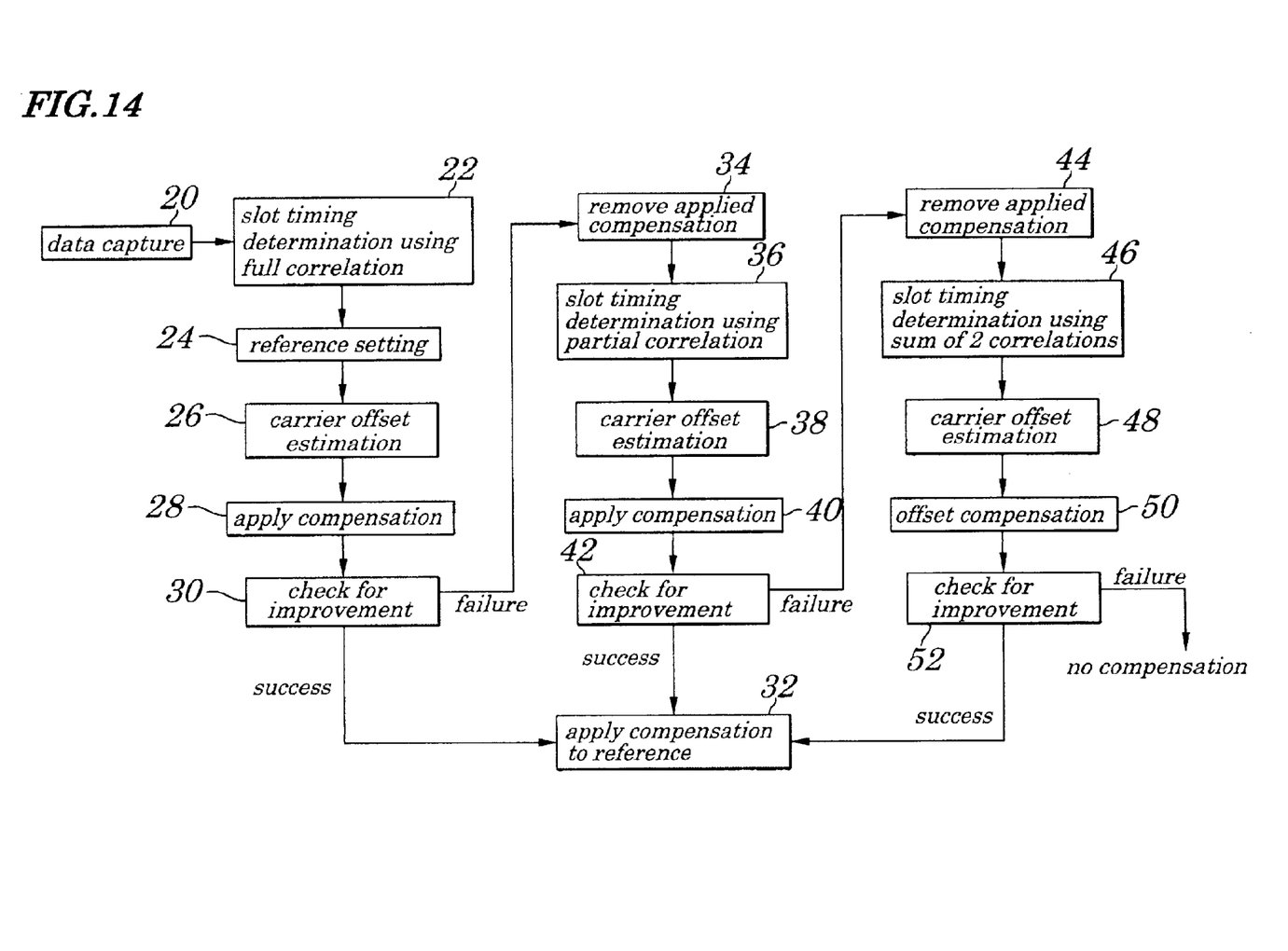
FIG. 14 shows an alternative to the flowchart of FIG. 13.

At FIG. 14, an alternative block diagram for the compensation estimation is shown. In this, captured data (20) is used at (22) to determine slot timing using a full correlation. This is done as in FIG. 13 by saving the largest correlation peak and assuming that its position is the first estimation of the slot boundary. The reference is saved at (24). Carrier offset estimation is then performed from the position of the assumed slot boundary at (26) and applied to the captured data block (28). At block (30) there is then a check for any improvement in the size of the largest correlation peak. If there is success then the compensation is applied to the reference oscillator at (32). If the compensation applied at (28) results in a lower correlation peak hen the compensation is removed from the captured data at (34) and an estimate of slot timing determined using partial correlation at (36). At (38), (40) and (42) carrier offset estimation is performed compensation applied to the captured data block, And improvements checked for as before. If there is an improvement compensation is then applied to the reference oscillator at (32). If there is no improvement then the compensation is removed from the captured data and slot timing is determined using the sum of two correlations, using the full correlation and the partial correlation from (22) and (36) at (46). Again, carrier offset estimation is performed at (48), compensation applied to the captured data block at (50) and improvements checked for at (52). If there is an improvement, then again compensation is applied to the reference oscillator at (32). If there is no improvement then no compensation is applied.

Figure 15:
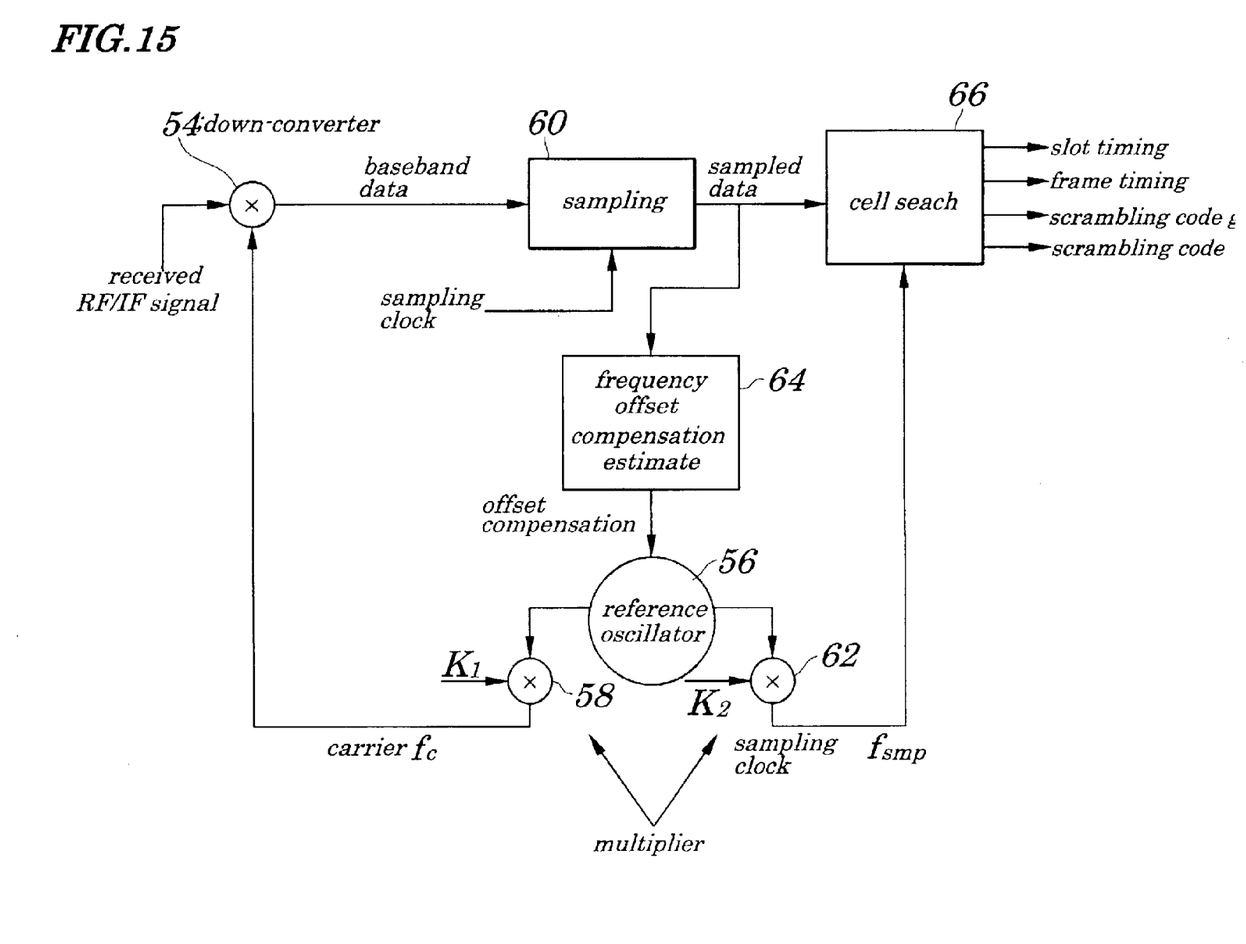
FIG. 15 shows a mobile receiver embodying the invention.

FIG. 15 shows schematically how all of this may be incorporated in a mobile receiver. In this, a received RF/IF signal is translated to a baseband signal by means of down converter (54). The down converter carrier frequency is provided by a reference oscillator (56) having its output multiplied by a constant $k_1$ in a multiplier (58).

The output of the down converter (54) is baseband data. The sampling clock is applied to a sampling unit (60) which receives the baseband data. This sampling clock $f_{smp}$ is produced by multiplying the output of a reference oscillator (56) with the constants $k_2$ in multiplier (62).

The sampled data from sampling unit (60) is provided to a frequency offset compensation estimation unit (64) which operates either according to FIG. 13 or FIG. 14. This, if appropriate, produces an offset compensation which is applied to the reference oscillator (56). The sampled data is also supplied to a cell search unit (66) which performs the remaining steps of the cell search process other than the slot timing, i.e., the frame timing, the scrambling code group of the data, and the scrambling code used. These latter steps do not form part of the present invention. The frequency offset compensation may be used independently from the cell search. In such a case, module (66) will perform all three steps of the cell search process.

It is noted that a mobile receiver as described in the above embodiments has a processor (not shown) to control each of components of the mobile receiver in accordance with a specified control program, a ROM (not shown) used to store the specified control program executed by the processor, a RAM (not shown) serving as a working area of the processor or the like.

It is apparent that the present invention is not limited to the above embodiments but may be changed and modified without departing from the scope and spirit of the invention.

What is claimed is:

1. A method for acquiring slot timing and frequency offset correction of a local oscillator in a direct sequence spread spectrum receiver wherein received signals include a plurality of sequential slots of data, at least one of which includes synchronization data, said method comprising the steps of: performing at least two different sequential and different correlations between received data and a locally stored synchronization code; comparing the results of said correlations; determining based on said comparison, which correlation gives the strongest correlation peak; performing at least one further correlation if the result of the comparison of correlation peaks shows that a second correlation gives a stronger peak than a first correlation; storing a time signal corresponding to said strongest correlation peak; estimating the offset to be applied to said local oscillator from said time signal; and applying said estimated offset to said local oscillator.

2. The method according to claim 1 wherein one of said correlations is generated from a correlation of the whole of said locally stored synchronization code with said received data.

3. The method according to claim 2 wherein one of said correlation peaks is derived from a sum of a plurality of correlations of parts of said locally stored synchronization code with said received data.

4. The method according to claim 3 wherein one of said correlation peaks is derived from a sum and average of repeated correlations with the whole of said locally stored synchronization code.

5. The method according to claim 3 wherein one of said correlation peaks is derived from a sum of full and partial correlations with said locally stored synchronization code.

6. An apparatus for acquiring slot timing and frequency offset correction of a local oscillator in a direct sequence spread spectrum receiver wherein received signals include a plurality of sequential slots of data, at least some of which includes synchronization data said apparatus comprising: means for performing at least two sequential and different correlations between received data and a locally stored synchronization code; means for comparing the results of said correlations; means for determining based on said comparison, which correlation gives the strongest correlation peak; means for storing a time signal corresponding to said strongest correlation peak; means for performing at least one further correlation if the result of the comparison of correlation peak shows that a second correlation give a stronger peak than a first correlation; means for estimating the offset to be applied to said local oscillator from said time signal; and means for applying said estimated offset to said local oscillator.

7. The apparatus according to claim 6 wherein one of said correlations is generated from a correlation of the whole of said locally stored synchronization code with said received data.

8. The apparatus according to claim 7 wherein said means for performing correlations includes mean for summing a plurality of correlations of parts of said locally stored synchronization code with said received data.

9. The apparatus according to claim 8 wherein said means for performing correlations includes means for summing and averaging repeated correlations with the whole of said locally stored synchronization code.

10. The apparatus according to claim 8 wherein said means for performing correlations includes means for summing two or more partial correlations with said locally stored synchronization code.

11. The apparatus according to claim 10 wherein said direct sequence spread spectrum receiver includes at least a telephone and a mobile telephone.

12. A storage medium storing a control program to cause a computer to carry out a method for acquiring slot timing and frequency offset correction of a local oscillator in a direct sequence spread spectrum receiver, said method comprising the steps of: performing at least two sequential and different correlations between received data and a locally stored synchronization code; comparing the results of said correlations; determining based on said comparison, which correlation gives the strongest correlation peak; storing a time signal corresponding to said strongest correlation peak; performing at least one further correlation if the result of the comparison of correlation peaks shows that a second correlation peaks shows that a second correlation gives a stronger peak than a first correlation; estimating the offset to be applied to said local oscillator from said time signal; and applying said estimated offset to said local oscillator.

* * * * *